April 9, 1968

V. WOUK 3,377,543

HIGH POWER CONVERTER

Filed Dec. 16, 1964

| SCR STATES FOR LOW LOAD | *-SCR FIRED<br>C-SCR CONDUCTIVE<br>NC-SCR NON CONDUCTIVE | | | | | | | | | |
|---|---|---|---|---|---|---|---|---|---|---|
| TIME | 1M | 2M | 1C | 2C | 3C | 4C | 5C | 6C | 7C | 8C |
| T1 | C* | NC | NC | NC | NC | C*/NC | NC | C*/NC | NC | NC |
| T2 | NC | NC | C* | C* | NC | NC | NC | NC | NC | NC |
| T3 | NC | NC | C | C | NC | NC | NC | NC | C*/NC | NC |
| T4 | NC | NC | C/NC | C/NC | NC | NC | C* | NC | NC | NC |
| T5 | NC | *C | NC | C*/NC | NC | NC | C*/NC | NC | NC | NC |
| T6 | NC | NC | NC | NC | C* | C* | NC | NC | NC | NC |
| T7 | NC | NC | NC | NC | C | C | NC | NC | NC | C*/NC |
| T8 | NC | NC | NC | NC | C/NC | C/NC | NC | C*/NC | NC | NC |

Fig. 5.

Inventor:
Victor Wouk
By: Wallenstein
Spangenberg &
Hattis  attys

United States Patent Office 3,377,543
Patented Apr. 9, 1968

3,377,543
HIGH POWER CONVERTER
Victor Wouk, New York, N.Y., assignor, by mesne assignments, to Gulton Industries, Inc., Metuchen, N.J., a corporation of New Jersey
Filed Dec. 16, 1964, Ser. No. 418,772
11 Claims. (Cl. 321—45)

ABSTRACT OF THE DISCLOSURE

A DC to AC converter circuit having a pair of DC input terminals and a transformer having a center tapped primary winding and a secondary winding, the center tap on said primary winding being connected to one of said DC input terminals, and a pair of unidirectional main load current carrying switch devices each being triggerable into a stable high conductive state where current flows readily only in one direction and which remains in the conductive state until current is interrupted or a DC counter voltage opposing such current flow is applied thereto, is provided with means connecting said main load current carrying switch devices respectively between the ends of said primary winding and the other DC input terminal wherein conduction of one of the devices passes current in one direction through one half of the primary winding and conduction of the other device passes current in the opposite direction through the other half of said primary winding. The switch devices are alternately triggered into conductive states and each conductive switch device is turned-off by means including a capacitor which is periodically charged to said DC counter voltage through switch means which normally isolate the capacitor from load current and periodically connect the charged capacitor across the currently conducting switch device and in series circuit relationship with the associated half of the primary winding and DC terminals, so the capacitor discharges through the winding and is in voltage aiding relationship with the voltage on the DC input terminals.

---

This invention relates to improvements in direct current (DC) to alternating (AC) inverter circuits utilizing SCR switch devices or the like.

Many inverter power supply circuits have been, heretofore, developed for converting DC to any predetermined AC or DC voltage level and maintaining that voltage level under varying supply and load conditions. It is usually desirable for such regulated power supplies to have a high operating efficiency and also, in many cases to be as compact as possible. The most efficient of these inverter circuits utilizes SCR switch devices and they are generally arranged in a bridge circuit requiring four such devices. This is a very satisfactory arrangement for input voltages in the order of magnitude of 80 volts or more. The inverter input may be connected to a full wave rectifier circuit fed from a sixty (60) cycle per second commercial AC supply. The SCR switch devices of the DC to AC inverter chop the DC input thereof into relatively high frequency rectangular AC pulses. The AC current pulses may be fed through the primary winding of an output transformer which increases or decreases the voltage in the secondary winding to meet the output requirements of the circuit. By stepping up the frequency of the input power in the inverter, the size and weight of the transformer is greatly reduced over comparable units of equal power handling capacities operating at normal power line frequencies.

An SCR switch device is a 3-terminal device having anode and cathode terminals (sometimes referred to as load terminals) and a control terminal. The SCR switch devices are operated by feeding triggering signals to the control terminals of the SCR switch device which fires the device provided the polarity of the voltage applied to the load terminals is in the proper (forward) direction. The conduction of a fired SCR switch device then continues independently of the signals fed to the control terminal thereof, termination of the conduction thereof being effected by interruption of the current flow as by the feeding of a reverse or counter voltage to the load terminals thereof for a sufficient interval.

The inverter circuit of the present invention has its most important utility in inverter circuits fed from low voltage DC supplies, as for example a 26 volt supply. At these voltage levels, the inverter circuit of the invention is much more efficient than the four element SCR bridge circuits referred to above.

An object of the present invention, therefore, is to provide a high current capacity DC to AC inverter circuit utilizing SCR switch devices or the like wherein the circuit is more efficient and economical than the SCR switch device bridge circuit heretofore developed at the low input voltages.

A further object of the invention is to provide an inverter circuit as described above which operates efficiently for practically all possible load conditions.

A still further object of the invention is to provide an inverter circuit as described which utilizes a commutating capacitor for feeding a counter voltage to the load terminals of the SCR switch devices.

The above mentioned and other objects are advantages of the invention and the various features thereof which accomplish these objects and advantages will become apparent upon making references to the specification to follow, the claims and the drawings wherein:

Figure 1:
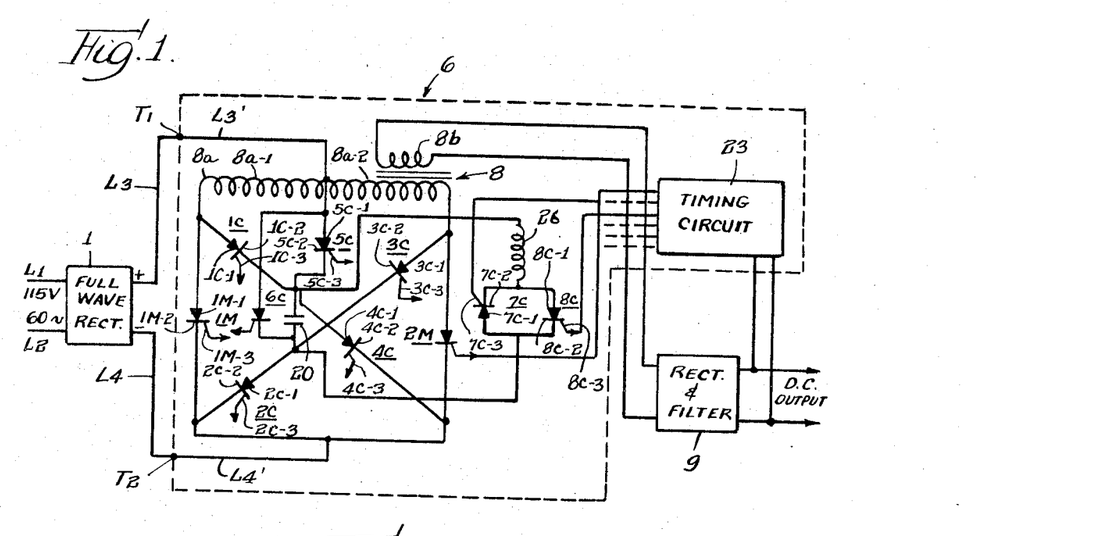
FIG. 1 illustrates a preferred inverter circuit of the present invention; utilized in a DC power supply.

Referring now to FIG. 1, the power supply thereshown includes a pair of input lines L1–L2 which may be connected to a 60 cycle per second commercial power supply. A rectifier circuit 1 coverts the AC signal on input lines L1–L2 to a DC voltage on a pair of output lines L3 and, L4 the line L3 being the positive line and the line L4 being the negative line. The lines L3 and L4 extend to input terminals T1 and T2 of an inverter circuit generally indicated by reference numeral 6. The inverter circuit 6 converts the DC voltage on lines L3 and L4 to a variable width AC voltage of rectangular wave shape at a substantially higher frequency than the power line frequency, such as 1.2 kilocycles or higher. This higher frequency voltage appears across the secondary or output winding 8b of an output transformer 8. The transformer has a center tapped primary winding 8a with winding halves 8a–1 and 8a–2 through which variable width current pulses are caused to flow in opposite directions during successive half cycles of the inverter output. The turns ratio of the windings 8a and 8b is determined in part by the desired output voltage of the power supply. The AC voltage across the secondary winding 8b is fed to a full wave rectifier and filter circuit 9 which converts the variable width rectangular waveform input signal thereof to DC, the magnitude of the DC output of the rectifier 9 being a function both of the amplitude of the rectangular waveform AC input thereof and the width of the rectangular waveforms pulsations thereof.

The inverter circuit 6 illustrated utilizes only two (2) relatively expensive main load current carrying SCR switch devices 1M and 2M and eight (8) relatively inexpensive low current rated control SCR switch devices 1C, 2C, 3C, 4C, 5C, 6C, 7C and 8C serving primarily control functions to be described. As is well known, SCR switch devices (also referred to as silicon controlled rectifiers) are unidirectional current carrying devices which operate analogously to thyratron tubes. Each SCR switch device includes anode and cathode or load electrode identified in FIG. 1 in some cases by reference numbers "–1" and "–2" respectively following the reference character designating the SCR switch device involved and a control electrode identified by the reference number "–3" following a number designating the SCR switch device involved. When the anode electrode of an SCR switch device is connected to a positive voltage and the cathode electrode is connected to a negative voltage, the feeding of a triggering signal to the control electrode thereof will effect a stable high conductive state thereof independently of the subsequent voltage conditions applied to the control electrode until the current flowing through the cathode and anode (load) terminals is interrupted in some way. This can be accomplished by feeding a voltage to be referred to as a counter voltage which opposes the applied voltage across the load terminals or by open circuiting the load current path.

The load terminals of the load current carrying SCR switch device 1M are connected across the outer end of primary winding half 8a–1 and a bus L4' connected to the negative inverter input terminals T2, with the anode electrode 1M–1 connected to the transformer winding 8a. A positive bus L3' extends between the positive terminal T1 and the center tap on the primary winding. The load terminals of the load current carrying SCR switch device 2M are connected across the outer end of primary winding half 8a–2 and the bus L4' with the anode electrode connected to the transformer winding 8a. It is thus apparent that when the SCR switch 1M is rendered conductive current will flow in one diretcion (right to left) through the primary winding half 8a–1, and, when the SCR switch devices 2M is rendered conductive current will flow through the primary winding half 8a–2 in the opposite direction (left to right).

The means for rendering the load current carrying SCR switch devices non-conductive includes a commutating capacitor 20 which has one plate connected respectively to the cathode and anode electrodes 1C–2 and 4C–1 of control switch devices 1C and 4C and another plate connected respectively to the anode and cathode electrodes 2C–1 and 3C–2 of switch devices 2C and 3C. The anode electrodes of control switch devices 1C and 3C are connected respectively to the anode electrodes of the switch devices 1M and 2M and the cathode electrode of the control switch devices 2C and 4C are connected respectively to the cathode electrodes of the switch devices 1M and 2M. When the control switch devices 1C and 2C are in a conductive state, the commutating capacitor 20 is effectively connected across the load terminals of the load current carrying switch device 1M, and when the control switch devices 3C and 4C are in a conductive state the commutating capacitor is effectively connected across the load terminals of the load current carrying SCR switch device 2M. The commutating capacitor 20 renders the load current carrying SCR switch device 1M non-conductive when the upper plate thereof connected through control switch device 1C to the anode electrode of the switch device 1M is negative with respect to the bottom plate thereof connected through control switch device 2C to the cathode electrode of the switch device 1M. The commutating capacitor 20 renders the load current carrying SCR switch device 2M non-conductive when the upper plate connected through control switch device 4C to the cathode electrode of the switch device 2M is positive with respect to the bottom plate thereof connected through the control switch device 3C to the anode electrode of the switch device 2M.

The commutating capacitor 20 is charged to the proper counter voltage in one of two ways. One of these involves the firing of the control switch device 4C–6C or 2C and 5C along with load current carrying switch device 1M or 2M at the beginning of each half cycle of operation of the inverter circuit. Thus when control switch devices 4C and 6C are fired the upper plate of the commutating capacitor 20 is connected to the negative bus L4' by control switch device 4C and the lower plate thereof is connected to the positive bus L3' by the control switch device 6C. When control switch devices 2C and 5C are fired the upper plate of the capacitor 20 is connected to the positive bus L3' by control switch device 5C and the lower plate is connected to the negative bus L4' by control switch device 2C. This capacitor charge circuit is an extremely low impedance circuit, and so very large peak currents are reached which result in substantial energy loss which would be undesirable if this were repeated each half cycle of operation of the circuit. However, the commutating capacitor 20 is charged in this manner only when the power is initially turned on, and thereafter the charge and discharge current of the capacitor 20 flows through the much higher impedance of the primary winding 8a of the transformer 8 where the energy which would otherwise be lost is coupled to the load. This higher impedance also limits the peak value of the currents involved and so minimizes energy loss due to the $I^2R$ losses in the conductors. As soon as the capacitor 20 becomes fully charged, the control switch devices in the charge circuit become non-conductive because the current path therethrough is interrupted by the capacitor 20 which does not allow any further current flow after the capacitor is fully charged.

Once the inverter circuit starts operation, the charging of the capacitor 20 each half cycle of operation is achieved at the same time the capacitor 20 is active in rendering one of the load current carrying switch devices 1M or 2M non-conductive. Since the associated pair of control switch devices 1C–2C or 3C–4C are then conducting, the capacitor is coupled between the busses L3' and L4' and so it discharges and then charges to a voltage of reverse polarity. After the capacitor fully charges to the new voltage, the current flow through the pair of control switch devices involved is interrupted so as to render them non-conductive.

Where a relatively large load is involved representing a small effective load resistance, the time constant of the discharge and charge path of the commutating capacitor 20 is relatively small and the capacitor has no difficulty in substantially fully discharging and then recharging to a reverse voltage in the short time interval permitted for this purpose.

Figure 2:
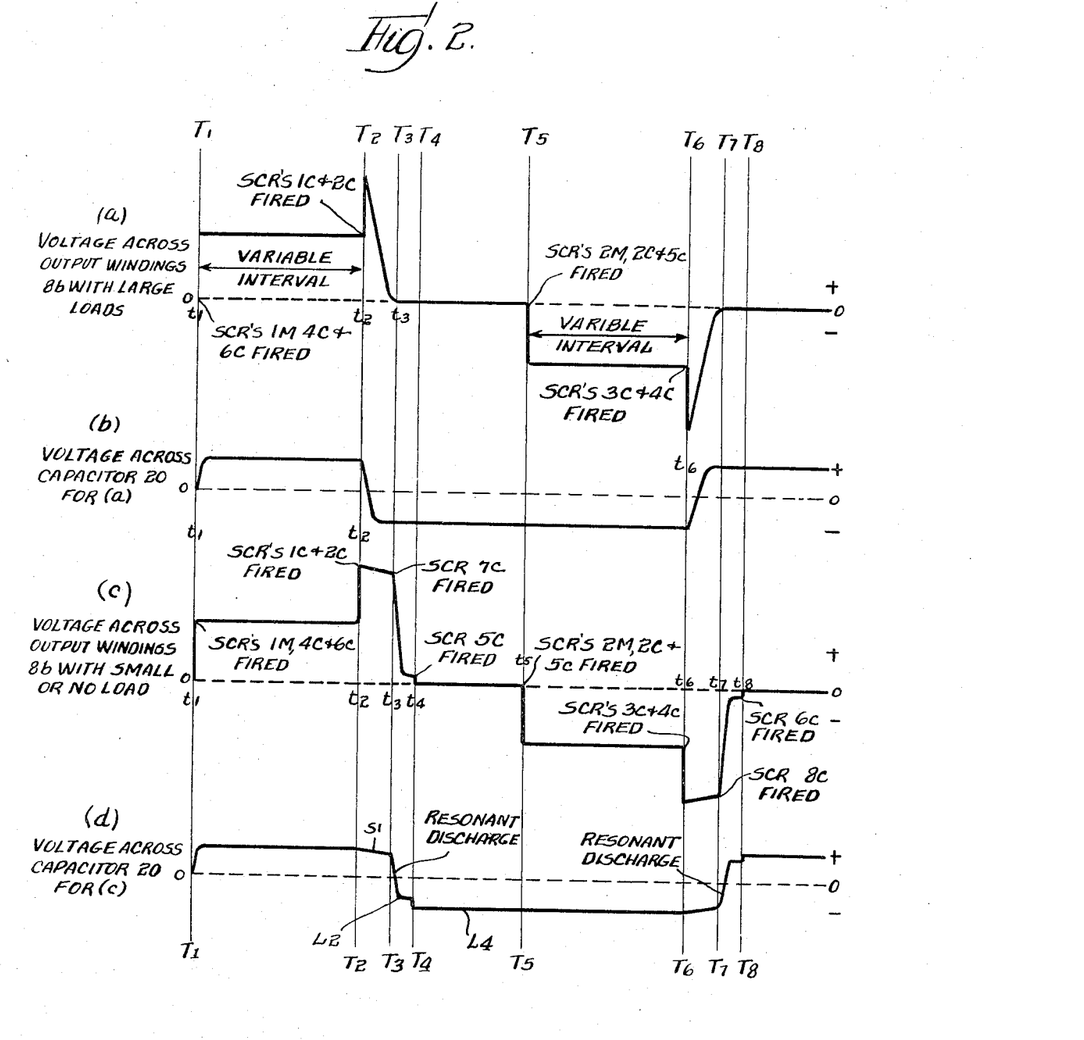
FIGS. 2(a) through 2(d) show the waveforms at different portions of the inverter in FIG. 1 under both normal and low load conditions.

The high load condition of operation is best illustrated in FIGS. 2a and 2b to which reference is now made for a better understanding of the circuit operation. FIG. 2a shows the voltage across the secondary output winding 8b of transformer 8 and FIG. 2b shows the voltage across the capacitor 20. Time T1 is assumed to be the instant when power is initially applied to the circuit and where the capacitor 20 has not previously been charged. It is also assumed that switch devices 1M, 4C and 6C are fired together at time T1. As previously indicated, capacitor 20 is then charged in a given direction due to the conduction of switch devices 4C and 2C. Current flows through the primary winding half 8a–1 which induces a voltage in the transformer secondary winding 8b (FIG. 2a). At time T2 when the switch devices 1C and 2C are fired and switch device 1M is rendered non-conductive, the voltage charge on the capacitor 20 adds to the voltage on the busses L3' and L4' to produce the voltage spike shown in FIG. 2a. Note from FIG. 2b that the capacitor 20 discharges to zero and then charges to a reverse value in a short time.

The operation of the circuit during the second half cycle starting at T5 is similar to the first half cycle just described. Thus, at the beginning of the second half cycle, switch devices 2M, 2C and 5C are simultaneously fired which results in current flow through the primary winding half 8a–2 in the opposite direction than that just described, which produces the portion of the voltage waveform of FIG. 2a below the zero line. For reasons which are now apparent, switch devices 2C and 5C are also rendered conductive at time T5 solely for the purpose of ensuring that the commutating capacitor 20 is charged properly should power be turned on just prior to T5 instead of at T1. When the circuit has already been operating, the firing of the latter switch device serves no useful purpose because the capacitor 20 will have already been charged to the proper value in a manner previously explained.

It frequently occurs that a power supply must operate efficiently over widely varying loads. This is difficult to achieve under no-load or low-load conditions where the effective resistance of the load is so high that the time constant of the discharge and charge circuit of the commutating capacitor 20 is so great that the capacitor cannot fully discharge and then recharge to an opposite value. The large time constant of the capacitor discharge circuit is shown by the small slope of the waveform portion between T2 and T3 in FIG. 2d. In accordance with the present invention, this problem is overcome by the addition of an inductance 26 and control SCR switch devices 7C and 8C. The inductance forms a resonant circuit with the capacitor 20 at a frequency which is many times higher than the operating frequency of the inverter. In the circuit shown in the drawings, the inductance 26 is connected between the upper plate of the commutating capacitor 20, and the anode electrode 8c–1 of the control switch device 8C. The cathode electrode 8C–2 of the switch device 8C is connected to the bottom plate of the capacitor 20. The cathode electrode 7C–2 of control switch device 7C is connected to the juncture of inductance 26 and the control switch device 8C, and the anode electrode 7C–1 thereof is connected to the bottom plate of the capacitor 20.

The control switch devices 7C and 8C are respectively operative during successive half cycles of the inverter circuit operation. As in the exemplary embodiment of the invention illustrated in the drawings, during the first half cycle of the inverter circuit the control switch device 7C is fired at time T3 while the capacitor 20 has discharged only a small amount due to the long time constant of the capacitor discharge circuit. The capacitor 20 then discharges through a passive loop circuit including the inductance 26 and the switch device 7C where the voltage on capacitor 20 reverses quickly due to the resonant action of the loop circuit. Upon completion of one-half cycle of the resultant resonance action, current ceases in the loop circuit because the switch device 7C conducts in only one direction. This results in negligible power losses. The peak currents flowing during this condition are moderate due to the current limiting action of the inductance 26. Due to the presence of some resistive impedance in this circuit, some reduction in the reverse voltage built up on the capacitor will take place, which is indicated by voltage level $L_2$ in FIG. 2d. As there shown, the capacitor charges to a voltage where the voltage on the upper plate is positive relative to the voltage on the lower plate. During this resonant discharge and recharging of the capacitor 20, the energy stored in the capacitor does not pass through the transformer primary winding 8a as in the case of the discharge and charge thereof under normal high load condition illustrated in FIGS. 2a and 2b.

The capacitor 20 is similarly resonantly discharged and charged to a reverse voltage during each second half cycle by the firing of control switch device 8C at time T7 (FIG. 2d) which again places inductance 26 in a resonant loop circuit with the capacitor 20.

It is significant to note that the inverter would not operate properly or efficiently if the capacitor were resonantly discharged and charged by placement of the inductance 26 in series with the power busses L3' or L4' so that the power for charging the capacitor 20 would come from the DC supply source. In such case, it can be shown that the voltage on the capacitor 20 would progressively build up to an extremely large magnitude, requiring expensive components which could withstand such voltage levels. The significant point about the placement of the capacitor 20 in the present invention is that it discharges resonantly through a circuit that has no source of power.

As previously indicated, the reverse charging of the capacitor 20 through the resonant loop circuit referred to will not completely charge the capacitor 20 to the desired level L4 indicated in FIG. 2d. This problem is overcome in each first half cycle by firing control switch device 5C at time T4 which connects the upper plate of the capacitor 20 to the positive bus L3', to charge the capacitor 20 fully to the total bus voltage. Power losses are negligible in the instance because of the small degree of charging which the capacitor must undergo. The problem is overcome during each second half cycle by firing control switch device 6C at time T8, which connects the bottom plate of capacitor 20 to the positive bus L3'.

Figure 3:
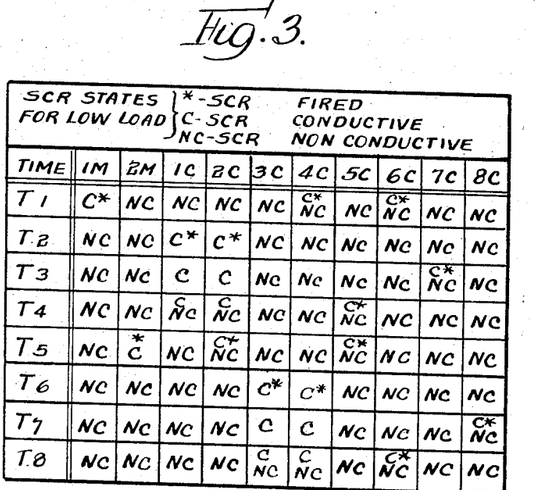
FIG. 3 is a chart indicating the sequence of the conduction (C) and non-conduction (NC) of the various SCR switch devices of the inverter under low load conditions.

FIG. 3 is a chart which summarizes the states of the various SCR switch devices shown in FIG. 1 at the various times indicated on FIGS. 2c and 2d.

The firing of the various SCR switch devices is controlled by timing pulses fed to the control electrodes thereof from a timing circuit generally indicated by reference numeral 23. The timing circuit operation is responsive to the amplitude of the output of the power supply. A momentary drop in this output will result in a delay in the phase of the timing pulses fed to the last control electrodes of the control SCR switch devices 1C and 2C and 3C and 4C, which effect turn-off of the conductive states of the load current carrying SCR switch devices 1M and 2M.

Figure 4:
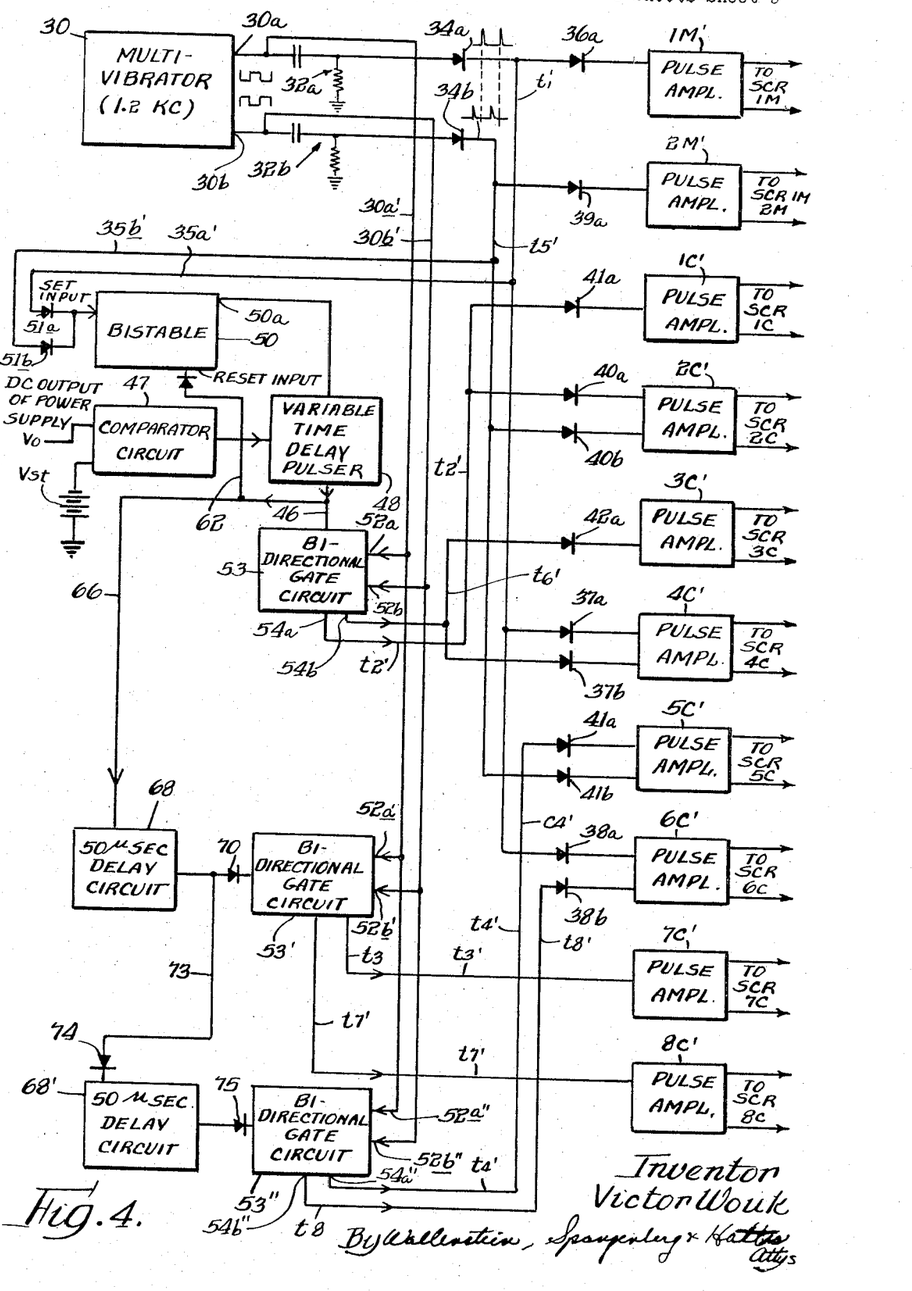
FIG. 4 is a detailed block diagram of the timing circuit portion of FIG. 1.

Referring now to FIG. 4 which illustrates in a detailed block diagram the components of an exemplary timing circuit 23. As there shown, the basic frequency of operation of the inverter circuit is controlled by a multivibrator 30 which, for example, may operate at a frequency of between 1 and 2 kilocycles. The multivibrator may comprise a pair of cross-coupled transistor stages having outputs 30a–30b were square waveforms appear which are 180° out of phase. Output line 30a is connected through a differentiating network 32a and a rectifier 34a which passes only the positive pulses coinciding with the voltage increases in the square waveform at the output 30a to a bus t1'. Output 30b is connected through a differentiating network 32b and a rectifier 34b which passes only the positive pulses coinciding with the voltage increases in the square waveform at the output 30b to a bus t5'. The positive output pulses on the busses t1' and t5' are thus 180° out of phase at the frequency of the inverter circuit. The positive pulses on the bus t1' are operative to effect firing of those SCR switch devices which operate during each first half cycle of the inverter operation and the positive pulses on the bus t5' are operative to effect firing of those SCR switch devices which operate during each second half cycle of the inverter operation. The inputs of pulse amplifiers 1M', 4C' and 6C' are connected through isolating rectifiers 36a, 37a and 38a to the bus t1'. The inputs of pulse amplifiers 2M', 2C' and 5C' are connected through isolating rectifiers 39a, 40b and 41b to the bus t5'. The outputs of pulse amplifiers 1M', 2M', 2C', 4C', 5C' and 6C' are respectively fed to the control electrodes of the SCR switch device 1M, 3M, 2C, 4C, 5C and 6C to effect the firing thereof at the appropriate times T1 or T5 at the beginning of the half cycles of inverter circuit operation which coincide with the beginning of the current pulses fed through the primary winding 8a of the transformer 8.

Figure 5:
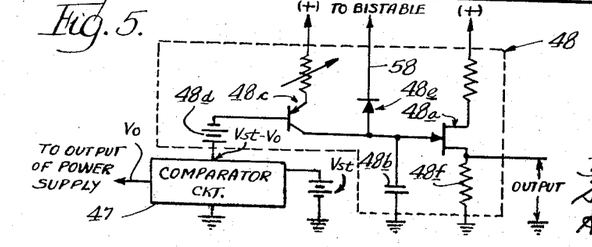
FIG. 5 illustrates an exemplary circuit for a component of the timing circuit shown in block form in FIG. 4.

The operation of the SCR switch devices in the periods between the start and finish of each half cycle (i.e. at T2, T3, T4, T6, T7 and T8) depends on the output conditions of the power supply and these times are related to the termination of the current pulses fed through the primary winding 8a of the transformer 8. The intervals between T2–T3–T7 and T6–T7–T8 are fixed. Only the intervals between T1–T2 and T5–T6 vary. To this end, a variable time delay pulser 48 is provided which generates pulses at the time instants T2 and T6 under control of a comparator circuit which is responsive to the output of the power supply. The comparator circuit compares the output voltage of the power supply circuit and a standard of voltage (Vst) and provides a control voltage which is a function of the difference between these voltages. Various circuits for generating a pulse whose phase depends upon the magnitude of a control voltage are well known in the art. The variable time delay pulser 48 may, for example, be a relaxation oscillator circuit utilizing a double-based diode 48a (see FIG. 5) and a capacitor 48b which discharges the capacitor when the double-based diode becomes conductive. The capacitor is charged through the load circuit of a transistor 48c whose base electrode is shown coupled to a biasing voltage 48d and to the output of the comparator circuit 47. The conductivity of the transistor 48c is thus dependent on the power supply output and the charge rate of the capacitor 48b varies with the conductivity of the transistor. When the voltage of the capacitor reaches the firing voltage of the double-based diode, the latter will fire to discharge the capacitor. The capacitor remains discharged due to a clamping voltage fed thereto through a diode 48e.

The charging of the capacitor 48b is initiated each half cycle by the removal of the clamping voltage which is a voltage fed from a bistable circuit 50. The clamping voltage may be a ground or negative voltage appearing at an output 50a (FIG. 4) thereof when the bistable is reset. The voltage at this output may be at the positive voltage of the supply voltage for the double-based diode 48a, or any voltage above that, when the bistable is set.

The bistable 50 is set by positive pulses appearing on branch lines 35a'–35b' respectively connected to the pulse busses t1' and t5' on which positive synchronizing pulses respectively appear coinciding with the beginning of each first and second half cycle of the inverter circuit operation. The branch lines 35a' and 34b' are connected through isolating rectifiers 51a and 51b to set the input of the bistable 50 so that each time it receives a positive pulse it will be triggered into a set state if it is then in a reset state. Thus, at the beginning of each half cycle, the bistable 50 will be in a set state enabling the capacitor 48b to charge.

A pulse is generated across resistor 48f in the base circuit of the double-based diode 48a each time the latter is fired, the phase of the pulse being a function of the charge rate of the capacitor 48b. The pulses appearing across this resistor, which constitutes the output of the time delay pulser 48, are fed to the input of a bi-directional gate circuit 53. The gate circuit 53 receives a control voltage from control input lines 52a and 52b which are respectively connected to branch lines 30a' and 30b' extending to the outputs 30a and 30b of the multivibrator 30 at which square wave voltages appear 180° out of phase. The input lines will thus receive positive voltages during alternating half cycles. A positive voltage on control input line 52a will result in the feeding of the input pulses to output line 54a and a positive voltage on control input line 52b will result in the feeding of the input pulses to output 54b. This type of bi-directional gate circuit is a well known circuit in the art and details thereof will, therefore, not be disclosed herein.

During each first half cycle (i.e. at time T2), a pulse will thus appear on the output 54a of gate circuit 53 which is coupled to a line t2' and through isolating rectifiers 40a and 41a to the inputs of the pulse amplifiers 1C' and 2C' which control the triggering of the switch devices 1C and 2C. During each second half cycle (i.e. at time T6), a pulse will appear on the output 54b of the gate circuit 53 which is coupled to a bus t6' and through an isolating rectifier 37b and 42a to the pulse amplifiers 3C' and 4C' which control the triggering of the switch devices 3C and 4C.

The output of the variable time delay pulser 48 is also coupled by a line 66 to the input of a delay circuit 68 which produces a positive pulse 50 microseconds after the pulse produced by the delay pulser. This positive pulse is coupled to the input of a bi-directional gate circuit 53', which is similar to the aforementioned gate circuit 53. The bi-directional gate circuit 53' has a control input line 52a' connected to branch line 30a' extending to the output 30a of the multivibrator circuit 30. The gate circuit 53' has another input line 52b' connected to branch line 30b' extending to the output 30b of the multivibrator circuit 30. Thus, during each first half cycle (i.e. at time T3), the positive voltage on the input line 52a' effects transfer of the positive pulse at the gate circuit input to an output line t3' extending to the input of pulse amplifier 7C' which controls the firing of the switch device 7C. During each second half cycle (i.e. time T7), the positive voltage on the input line 52b' effects transfer of the positive pulse at the gate circuit input to the output line t7' connected to the input of pulse amplifier 8C' which controls the firing of the switch device 8C.

The output of the 50 microsecond delay circuit 68 is coupled through a line 73 and a rectifier 74 to the input of another delay circuit 68', which is similar to the delay circuit 68. The delayed positive pulse output of the delay circuit 68' is fed through a rectifier 75 to the input of a bi-directional gate circuit 53" which is similar to the gate circuits 53' and 53 previously described. Thus, the gate circuit 53" has a control input line 52a" connected to the branch line 30a' extending to the output 30a of the multivibrator 30. The gate circuit 53" also has an input line 52b" connected to the branch line 30b' extending to the output 30b of the multivibrator 30.

When a positive voltage appears on the input line 52a" during each first half cycle, the delayed pulse fed to the input of the gate circuit 53" at time T4 appears on an output 54a" connected to a bus t4' and through an isolating rectifier 41a to the input of the pulse amplifier 5C' controlling the firing of the switch device 5C. When a positive voltage appears on the input line 52b" during each second half cycle, the delayed pulse fed to the input of the gate circuit 53" at time T8 will be fed to the output 54b" connected to a bus t8' and through an isolating rectifier 38b to the input of the pulse amplifier 6C' controlling the firing of the switch device 6C.

The timing circuit 23 just described ensures that the timing intervals between each half cycle of operation of the inverter circuit are substantially identical.

It should be understood that numerous modifications may be made in the preferred form of the invention described above without deviating from the broader aspects of the invention.

I claim:
1. A DC to AC converter system comprising: a pair of DC input terminals, a transformer having a center tapped primary winding and a secondary winding, the center tap on said primary winding being connected to one of said DC input terminals, a pair of unidirectional main load current carrying switch devices each being triggerable into a stable high conductive state where current flows readily only in one direction and which remains in the conductive state until current is interrupted or a DC counter voltage opposing such current flow is applied thereto, means connecting said main load current carrying switch devices respectively between the ends of the primary winding and the other DC input terminal wherein conduction of one of the devices passes current in one direction through one half of the primary winding and conduction of the other device passes current in the opposite direction through the other half of said primary winding, means for periodically alternately triggering said main current carrying switch devices for causing current to pass through said primary winding alternately in opposite directions to produce an AC voltage in said secondary winding means, and means for alternately stopping the conduction of said main current carrying switch devices, said last-mentioned means including a capacitor and means for periodically charging said capacitor to said DC counter voltage and switch means normally isolating said capacitor from load current flowing through said main load current carrying switch devices for periodically connecting said charged capacitor in parallel conduction stopping relation to the currently conducting switch device to render the same non-conductive and in series relation with the associated half of the primary winding and said DC input terminals, where the charge on the capacitor discharges through said primary winding and is in voltage aiding relation with the DC voltage on said DC input terminals, whereby the energy stored in said capacitor and discharged through said primary winding increases the energy coupled through the transformer.

2. A DC to AC converter system comprising: a pair of DC input terminals, a transformer having a center tapped primary winding and a secondary winding, the center tap on said primary winding being connected to one of said DC input terminals, a pair of unidirectional main load current carrying switch devices each being triggerable into a stable high conductive state where current flows readily only in one direction and which remains in the conductive state until current is interrupted or a DC counter voltage opposing such current flow is applied thereto, means connecting said main load current carrying switch devices respectively between the ends of said primary winding and the other DC input terminal wherein conduction of one of the devices passes current in one direction through one half of the primary winding and conduction of the other device passes current in the opposite direction through the other half of said primary winding, means for periodically alternately triggering said main current carrying switch devices for causing current to pass through said primary winding alternately in opposite directions to produce an AC voltage in said secondary winding means, means for alternately stopping the conduction of said main current carrying switch devices comprising capacitor means, switch means normally isolating said capacitor means from load current flowing through said main load current carrying switch devices, for coupling said capacitor means when charged to said DC counter voltage simultaneously across the main load current carrying switch device which is in a conductive state for stopping the conduction thereof and in series circuit voltage aiding relation with said primary winding and said DC input terminals for effecting first the discharge of the capacitor means through said primary winding and then the reverse charging of the capacitor means whereby the energy stored in said capacitor means and discharged through said primary winding increases the energy coupled through the transformer.

3. A DC to AC converter system comprising: a pair of DC input terminals, a transformer having a center tapped primary winding and a secondary winding, the center tap on said primary winding being connected to one of said DC input terminals, a pair of unidirectional main load current carrying switch devices each being triggerable into a stable high conductive state where current flows readily only in one directon and which remains in the conductive state until current is interrupted or a DC counter voltage opposing such current flow is applied thereto, means connecting said main load current carrying switch devices respectively between the ends of said primary winding and the other DC input terminal wherein conduction of one of the devices passes current in one direction through one half of the primary winding and conduction of the other device passes current in the opposite direction through the other half of said primary winding, means for periodically alternately triggering said main current carrying switch devices for causing current to pass through said primary winding alternately in opposite directions to produce an AC voltage in said secondary winding means, means for alternately stopping the conduction of said main current carrying switch devices comprising a capacitor, first switch means for coupling said capacitor when charged in one direction to said DC counter voltage simultaneously across one of the main load current carrying switch devices when it is in a conductive state for stopping the conduction thereof and in series circuit voltage aiding relation with said DC input terminals and primary winding for effecting the discharge of the capacitor through said primary winding, and second switch means for coupling the capacitor when charged in the opposite direction to said DC counter voltage simultaneously across the other main load current carrying switch device when it is in a conductive state for stopping the conduction thereof and in series circuit voltage aiding relation with said DC input terminals and primary winding for effecting the discharge of the capacitor through said primary winding.

4. A DC to AC converter system comprising: a pair of DC input terminals, a transformer having a center tapped primary winding and a secondary winding, the center tap on said primary winding being connected to one of said DC input terminals, a pair of unidirectional main load current carrying switch devices each being triggerable into a stable high conductive state where current flows readily only in one direction and which remains in the conductive state until current is interrupted or a DC counter voltage opposing such current flow is applied thereto, means connecting said main load current carrying switch devices respectively between the ends of said primary winding and the other DC input terminal wherein conduction of one of the devices passes current in one direction through one half of the primary winding and conduction of the other device passes current in the opposite direction through the other half of said primary winding, means for periodically alternately triggering said main current carrying switch devices for causing current to pass through said primary winding alternately in opposite directions to produce an AC voltage in said secondary winding means, means for alternately stopping the conduction of said main current carrying switch devices, said last-mentioned means including a capacitor and means for periodically charging said capacitor to said DC counter voltage and for periodically connecting said charged capacitor in parallel conduction stopping relation to the currently conducting switch device and in series relation with the associated half of the primary winding and said DC input terminals, where the charge on the capacitor discharges through said primary winding and is in voltage aiding relation with the DC voltage on said DC input terminals, whereby the energy stored in said capacitor and discharged through said primary winding increases the energy coupled through the transformer, and means for reversing the charge on said capacitor comprising inductance means and switch means forming with said capacitor a loop circuit excluding said DC input terminals and where the inductance means and capacitor form a passive transient resonant circuit at a frequency substantially in excess of the frequency of the AC produced by the inverter circuit, and switch control means for rendering the last-mentioned switch means conductive to effect a transient resonant discharge and then a reverse charging of the capacitor, the switch means becoming non-conductive during the first cycle of the transient to terminate the transient before the voltage across the capacitor again reverses.

5. A DC to AC converter system comprising: a pair of DC input terminals, a transformer having a center tapped primary winding and a secondary winding, the center tap on said primary winding being connected to one of said DC input terminals, a pair of unidirectional main load current carrying switch devices each being triggerable into a stable high conductive state where current flows readily only in one direction and which remains in the conductive state until current is interrupted or a DC counter voltage opposing such current flow is applied thereto, means connecting said main load current carrying switch devices respectively between the ends of said primary winding and the other DC input terminal wherein conduction of one of the devices passes current in one direction through one half of the primary winding and conduction of the other device passes current in the opposite direction through the other half of said primary winding, means for periodically alternately triggering said main current carrying switch devices for causing current to pass through said primary winding alternately in opposite directions to produce an AC voltage in said secondary winding means, means for alternately stopping the conduction of said main current carrying switch devices comprising capacitor means, first switch means for coupling said capacitor means when charged in one direction to said DC counter voltage simultaneously across one of the main load current carrying switch devices when it is in a conductive state for stopping the conduction thereof and in series circuit relation with said primary winding and said DC input terminals for effecting the discharge of the capacitor means through said primary winding, second switch means for coupling the capacitor means when charged in the opposite direction to said DC counter voltage simultaneously across the other main load current carrying switch device when it is in a conductive state for stopping the conduction thereof and in series circuit relation with said primary winding and said DC input terminals for effecting the discharge of the capacitor, and means for accelerating the speed of discharge of said capacitor means under relatively low load conditions comprising inductance means and switch means forming with said capacitor a loop circuit excluding said DC input terminals, the inductance and capacitor forming a passive transient resonant circuit at a frequency substantially in excess of the frequency of the AC produced by the inverter circuit, and switch control means for rendering the last-mentioned switch means conductive at an instant subsequent to the time the capacitor means would have substantially fully reversed its charge under relatively high load conditions, to effect a transient resonant discharge and then a reverse charging of the capacitor means, the switch means becoming non-conductive during the first half cycle of the transient to terminate the transient before the voltage across the capacitor again reverses.

6. A regulated DC to AC converter system comprising a pair of DC input terminals, a transformer having a center tapped primary winding and a secondary winding, at least eight unidirectional switch devices each having a pair of load terminals and a control terminal and each triggerable by a control voltage on said control terminal into a high conductive state where current flows readily and only in one direction therethrough and which remains in the conductive state until a counter voltage opposing such current flow is applied to said load terminals thereof, at least two of said switch devices being primarily control switch devices, means connecting the center tap of said primary winding means to one of said D.C. input terminals, means coupling the load terminals of a first (1M) one of said main load current carrying switch devices between one end of said primary winding and the other DC input terminal for effecting current flow in one direction through one half of the primary winding when the first (1M) switch device is in a conductive state, means coupling the load terminals of the other (2M) main load current carrying switch devices between the other end of said primary winding and the latter DC input terminal for effecting current flow in the other direction through the other half of the primary winding when the latter switch device is in a conductive state, a capacitor for storing said counter voltage, means coupling said capacitor in series between one of the load terminal of a first (1C) and a second (2C) one of said control switch devices which allow curernt flow therethrough in the same direction, one of the load terminals of each of the latter devices being connected respectively to the opposite load terminals of said first (1M) main load current carrying switch device to couple a forward counter voltage stored on said capacitor across the load terminals of the (1M) main load current carrying switch device to terminate the conductive state thereof, to discharge the capacitor through said primary winding means in one direction and to aid in the reverse charging of said capacitor when control switch devices (1C) and (2C) are in a conductive state, means coupling said capacitor in series between one of the load terminals of a third (3C) and fourth (4C) one of said control switch devices which allow current flow therethrough in the same direction, one of the load terminals of each of the latter devices being connected respectively to the opposite load terminals of said other (2M) main load current carrying switch device to couple a reverse counter voltage stored on said capacitor across the load terminals of the second (2M) main load current carrying switch device to terminate the conductive state thereof, to discharge the capacitor through said primary winding in the opposite direction and to aid in the recharging of said capacitor when the control switch devices (3C) and (4C) are in a conductive state, means for coupling a fifth (5C) one of said control switch devices between the center tap of said primary winding and one of the terminals of the capacitor for effecting with said second (2C) control switch device charging of said capacitor to said forward counter voltage, means for coupling a sixth (6C) one of said control switch devices between the center tap of said primary winding and the other terminal of the capacitor for effecting with said fourth (4C) control switch device charging of said capacitor to said reverse counter voltage, and means for repeatedly feeding triggering signals to the control terminals of said switch devices in the following repetitive sequence:

| Time | 1M | 2M | 1C | 2C | 3C | 4C | 5C | 6C |
|---|---|---|---|---|---|---|---|---|
| ta | X |   |   |   |   |   | X | X |
| tb |   |   | X | X |   |   |   |   |
| tc |   | X |   |   | X |   |   | X |
| td |   |   |   |   |   | X | X |   | where *ta, tb, tc,* and *td* are sequentially related instants of time in the order given and X indicates that the switch device involved is triggered into a conductive state at the instant involved.

7. A regulated DC and AC converter system comprising a pair of DC input terminals, a transformer having a center tapped primary winding and a secondary winding, at least ten unidirectional switch devices each having a pair of load terminals and a control terminal and each triggerable by a control voltage on said control terminal into a high conductive state where current flows readily and only in one direction therethrough and which remains in the conductive state until a counter voltage opposing such current flow is applied to said load terminals thereof, at least two of said switch devices being primarily control switch devices, means connecting the center tap of said primary winding means to one of said DC input terminals, means coupling the load terminals of a first (1M) one of said main load current carrying switch devices between one end of said primary winding and the other DC input terminals for effecting current flow in one direction through one half of the primary winding when the first (1M) switch device is in a conductive state, means coupling the load terminals of the other (2M) main load current carrying switch devices between the other end of said primary winding and the latter DC input terminal for effecting current flow in the other direction through the other half of the primary winding when the latter switch device is in a conductive state, a capacitor for storing said counter voltage, means coupling said capacitor in series between one of the load terminals of a first (1C) and a second (2C) one of said control switch devices which allow current flow therethrough in the same direction, one of the load terminals of each of the latter devices being connected respectively to the opposite load terminals of said first (1M) main load current carrying switch device to couple a forward counter voltage stored on said capacitor across the load terminals of the (1M) main load current carrying switch device to terminate the conductive stage thereof, to discharge the capacitor through said primary winding means in one direction and to aid in the reverse charging of said capacitor when control switch devices (1C) and (2C) are in a conductive state, means coupling said capacitor in series between one of the load terminals of a third (3C) and fourth (4C) one of said control switch devices which allow current flow therethrough in the same direction, one of the load terminals of each of the latter devices being connected respectively to the opposite load terminals of said other (2M) main load current carrying switch device to couple a reverse counter voltage stored on said capacitor across the load terminals of the second (2M) main load current carrying switch device to terminate the conductive state thereof, to discharge the capacitor through said primary winding in the opposite direction and to aid in the recharging of said capacitor when the control switch devices (3C) and (4C) are in a conductive state, means for coupling a fifth (5C) one of said control switch devices between the center tap of said primary winding and one of the terminals of the capacitor for effecting with said second (2C) control switch device charging of said capacitor to said forward counter voltage, means for coupling a sixth (6C) one of said control switch devices between the center tap of said primary winding and the other terminal of the capacitor for effecting with said fourth (4C) control switch device charging of said capacitor to said reverse counter voltage, and means for repeatedly feeding triggering signals to the control terminals of said switch devices in the following repetitive sequence:

| Time | 1M | 2M | 1C | 2C | 3C | 4C | 5C | 6C |
|------|----|----|----|----|----|----|----|----|
| ta   | X  |    |    |    |    |    |    |    |
| tb   |    |    |    |    | X  |    | X  |    |
| tc   |    | X  | X  |    |    |    |    | X  |
| td   |    |    | X  |    | X  |    |    |    |
|      |    |    |    |    | X  | X  |    |    | where *ta, tb, tc* and *td* are sequentially related instants of time in the order given and X indicates that the switch device involved is triggered into a conductive state at the instant involved.

8. A regulated DC to AC converter system comprising a pair of DC input terminals, a transformer having a center tapped primary winding and a secondary winding, at least ten unidirectional switch devices each having a pair of load terminals and a control terminal and each triggerable by a control voltage on said control terminal into a high conductive state where current flows readily and only in one direction therethrough and which remains in the conductive state until a counter voltage opposing such current flow is applied to said load terminals thereof, at least two of said switch devices being primary control switch devices, means connecting the center tap of said primary winding means to one of said DC input terminals, means coupling the load terminals of a first (1M) one of said main load current carrying switch devices between one end of said primary winding and the other DC input terminal for effecting current flow in one direction through one half of the primary winding when the first (1M) switch device is in a conductive state, means coupling the load terminals of the other (2M) main load current carrying switch devices between the other end of said primary winding and the latter DC input terminal for effecting current flow in the other direction through the other half of the primary winding when the latter switch device is in a conductive state, a capacitor for storing said counter voltage, means coupling said capacitor in series between one of the load terminals of a first (1C) and a second (2C) one of said control switch devices which allow current flow therethrough in the same direction, one of the load terminals of each of the latter devices being connected respectively to the opposite load terminals of said first (1M) main load current carrying switch device to couple a forward counter voltage stored on said capacitor across the load terminals of the (1M) main load current carrying switch device to terminate the conductive state thereof, to discharge the capacitor through said primary winding means in one direction and to aid in the reverse charging of said capacitor when control switch devices (1C) and (2C) are in a conductive state, means coupling said capacitor in series between one of the load terminals of a third (3C) and fourth (4C) one of said control switch devices which allow current flow therethrough in the same direction, one of the load terminals of each of the latter devices being connected respectively to the opposite load terminals of said other (2M) main load current carrying switch device to couple a reverse counter voltage stored on said capacitor across the load terminals of the second (2M) main load current carrying switch device to terminate the conductive state thereof, to discharge the capacitor through said primary winding in the opposite direction and to aid in the recharging of said capacitor when the control switch devices (3C) and (4C) are in a conductive state, means for coupling a fifth (5C) one of said control switch devices between the center tap of said primary winding and one of the terminals of the capacitor for effecting with said second (2C) control switch device charging of said capacitor to said forward counter voltage, means for coupling a sixth (6C) one of said control switch devices between the center tap of said primary winding and the other terminal of the capacitor for effecting with said fourth (4C) control switch device charging of said capacitor to said reverse counter voltage, an inductance for forming a resonant circuit with said capacitor at a frequency greatly in excess of the AC output frequency of the converter system, means coupling said inductance and the reverse, parallel connected load terminals of a seventh (7C) and eighth (8C) one of said control switch devices in series across said capacitor for rapidly discharging the counter voltage thereon when one of these devices is conductive, the seventh (7C) control switch device being connected to discharge said forward counter voltage when conductive and the eighth (8C) control switch device being connected to discharge said reverse counter voltage when conductive and means for repeatedly feeding triggering signals to the control terminals of said switch devices in the following repetitive sequence:

| Time | 1M | 2M | 1C | 2C | 3C | 4C | 5C | 6C | 7C | 8C |
|------|----|----|----|----|----|----|----|----|----|----|
| ta   | X  |    |    |    |    |    |    |    |    |    |
| tb   |    |    |    |    | X  | X  |    |    |    |    |
| tc   |    |    |    |    |    |    | X  |    | X  |    |
| td   |    | X  | X  |    |    |    |    |    |    |    |
| te   |    |    |    |    | X  | X  |    |    |    | X  |
| tf   |    |    |    |    |    |    |    |    |    | X  | where *ta, tb, tc, td, te* and *tf* are sequentially related instants of time in the order given and X indicates that the switch device involved is triggered into a conductive state at the instant involved.

9. A regulated DC to AC converter system comprising a pair of DC input terminals, a transformer having a center tapped primary winding and a secondary winding, at least ten unidirectional switch devices each having a pair of load terminals and a control terminal and each triggerable by a control voltage on said control terminal into a high conductive state where current flows readily and only in one direction therethrough and which remains in the conductive state until a counter voltage opposing such current flow is applied to said load terminals thereof, at least two of said switch devices being primarily control switch devices, means connecting the center tap of said primary winding means to one of said DC input terminals, means coupling the load terminals of a first (1M) one of said main load current carrying switch devices between one end of said primary winding and the other DC input terminal for effecting current flow in one direction through one half of the primary winding when the first (1M) switch device is in a conductive state, means coupling the load terminals of the other (2M) main load current carrying switch devices between the other end of said primary winding and the latter DC input terminal for effecting current flow in the other direction through the other half of the primary winding when the latter switch device is in a conductive state, a capacitor for storing said counter voltage, means coupling said capacitor in series between one of the load terminals of a first (1C) and a second (2C) one of said control switch devices which allow current flow therethrough in the same direction, one of the load terminals of each of the latter devices being connected respectively to the opposite load terminals of said first (1M) main load current carrying switch device to couple a forward counter voltage stored on said capacitor across the load terminals of the (1M) main load current carrying switch device to terminate the conductive state thereof, to discharge the capacitor through said primary winding means in one direction and to aid in the reverse charging of said capacitor when control switch devices (1C) and (2C) are in a conductive state, means coupling said capacitor in series between one of the load terminals of a third (3C) and fourth (4C) one of said control switch devices which allow current flow therethrough in the same direction, one of the load terminals of each of the latter devices being connected respectively to the opposite load terminals of said other (2M) main load current carrying switch device to couple a reverse counter voltage stored on said capacitor across the load terminals of the second (2M) main load current carrying switch device to terminate the conductive state thereof, to discharge the capacitor through said primary winding in the opposite direction and to aid in the recharging of said capacitor when the control switch devices (3C) and (4C) are in a conductive state, means for coupling a fifth (5C) one of said control switch devices between the center tap of said primary winding and one of the terminals of the capacitor for effecting with said second (2C) control switch device charging of said capacitor to said forward counter voltage, means for coupling a sixth (6C) one of said control switch devices between the center tap of said primary winding and the other terminal of the capacitor for effecting with said fourth (4C) control switch device charging of said capacitor to said reverse counter voltage, an inductance for forming a resonant circuit with said capacitor at a frequency greatly in excess of the AC output frequency of the converter system, means coupling said inductance and the reverse, parallel connected load terminals of a seventh (7C) and eighth (8C) one of said control switch devices in series across said capacitor for rapidly discharging the counter voltage thereon when one of these devices is conductive, the seventh (7C) control switch device being connected to discharge said forward counter voltage when conductive and the eighth (8C) control switch device being connected to discharge said reverse counter voltage when conductive, and means for repeatedly feeding triggering signals to the control terminals of said switch devices in the following repetitive sequence:

| Time | 1M | 2M | 1C | 2C | 3C | 4C | 5C | 6C | 7C | 8C |
|------|----|----|----|----|----|----|----|----|----|-----|
| t1   | X  |    |    |    |    | X  |    | X  |    |     |
| t2   |    |    | X  | X  |    |    |    |    |    |     |
| t3   |    |    |    |    |    |    |    |    |    | X   |
| t4   |    |    |    |    |    |    | X  |    |    |     |
| t5   |    | X  |    | X  |    | X  |    |    |    |     |
| t6   |    |    |    |    | X  | X  |    |    |    |     |
| t7   |    |    |    |    |    |    |    |    |    | X   |
| t8   |    |    |    |    |    |    |    |    | X  |     | where t1, t2, t3, t4, t5, t6, t7, and t8 are sequentially related instants of time in the order given and X indicates that the switch device involved is triggered into a conductive state at the instant involved.

10. In a circuit including a source of DC voltage, a load to be fed by current from said source of DC voltage, the improvement in a current control circuit coupled between said source of DC voltage and said load, said current control circuit comprising: at least one unidirectional main load current carrying switch device triggerable into a stable high conductive state where current flows readily only in one direction and which remains in the conductive state until current is interrupted or a DC counter voltage opposing such current flow is applied thereto; means coupling said main load current carrying device between said source of DC voltage and said load; means for intermittently triggering said main current carrying switch device for causing current to flow therethrough; and means for terminating the conduction of said main current carrying switch device, said conduction terminating means including capacitor means, switch means normally isolating said capacitor means from load current flowing through said main load current carrying switch device and coupling said capacitor means charged to said DC counter voltage simultaneously across the main load current carrying switch device when the device is in a conductive state for stopping the conduction thereof, and in series circuit voltage aiding relation with said source of DC voltage and said load where the charge on the capacitor means discharges through said load and is in voltage aiding relation with the DC voltage of said source of DC voltage, whereby the energy stored in said capacitor means and discharged through said load increases the energy coupled to the load.

11. A DC to AC converter system comprising: a pair of DC input terminals, a transformer having a center tapped primary winding and a secondary winding, the center tap on said primary winding being connected to one of said DC input terminals, a pair of unidirectional main load current carrying switch devices each being triggerable into a stable high conductive state where current flows readily until current is interrupted or a DC counter voltage opposing such current flow is applied thereto, means connecting said main load current carrying switch devices respectively between the ends of said primary winding and the other DC input terminal wherein conduction of one of the devices passes current in one direction through one half of the primary winding and conduction of the other device passes current in the opposite direction through the other half of said primary winding, means for periodically alternately triggering said main current carrying switch devices for causing current to pass through said primary winding alternately in opposite directions to produce an AC voltage in said secondary windings, means for alternately stopping the conduction of said main current carrying switch devices, said last-mentioned means including a capacitor and switch means for coupling said capacitor between the center tap of said primary winding and said other DC input terminal for charging said capacitor to said DC counter voltage and for periodically connecting said charged capacitor in parallel conduction stopping relation to the currently conducting switch device and in series voltage aiding relation with the said DC input terminals and the associated half of the primary winding where the charge on the capacitor discharges through said primary winding and is in voltage aiding relation with the DC voltage on said DC input terminals, whereby the energy stored in said capacitor discharged through said primary winding increases the energy coupled through the transformer.

References Cited

UNITED STATES PATENTS

| | | | |
|---|---|---|---|
| 3,181,053 | 4/1965 | Amato | 321—45 |
| 3,207,974 | 9/1965 | McMurray | 321—45 |
| 3,222,587 | 12/1965 | Lichowsky | 321—45 |
| 3,281,644 | 10/1966 | Moore et al. | 321—45 |
| 3,303,407 | 2/1967 | Depenbrook et al. | 321—45 |
| 3,315,144 | 4/1967 | Poss | 321—45 X |

JOHN F. COUCH, *Primary Examiner.*

W. M. SHOOP, *Assistant Examiner.*